United States Patent
Burt

(10) Patent No.: US 8,621,856 B2
(45) Date of Patent: Jan. 7, 2014

(54) HYDRAULIC DRIVE TRAIN WITH ENERGY DISSIPATION FOR ELECTRICITY GENERATION

(75) Inventor: Richard Burt, Wolfeboro, NH (US)

(73) Assignee: Windera Power Systems, Inc., Sanford, FL (US)

( * ) Notice: Subject to any disclaimer, the term of this patent is extended or adjusted under 35 U.S.C. 154(b) by 389 days.

(21) Appl. No.: 12/652,493

(22) Filed: Jan. 5, 2010

(65) Prior Publication Data

US 2010/0207398 A1 Aug. 19, 2010

Related U.S. Application Data

(60) Provisional application No. 61/204,288, filed on Jan. 5, 2009.

(51) Int. Cl.
*F03D 7/00* (2006.01)

(52) U.S. Cl.
USPC .............................. 60/398; 290/55

(58) Field of Classification Search
USPC ..................................... 290/44, 55
See application file for complete search history.

(56) References Cited

U.S. PATENT DOCUMENTS

| | | | | |
|---|---|---|---|---|
| 3,655,293 A | * | 4/1972 | Williams | 415/17 |
| 4,496,847 A | * | 1/1985 | Parkins | 290/44 |
| 4,503,673 A | * | 3/1985 | Schachle et al. | 60/398 |
| 5,725,358 A | * | 3/1998 | Bert et al. | 417/44.2 |
| 5,996,342 A | | 12/1999 | Khan et al. | |
| 6,074,170 A | * | 6/2000 | Bert et al. | 417/44.2 |
| 6,394,206 B1 | | 5/2002 | Fury | |
| 6,731,017 B2 | | 5/2004 | Mikhall et al. | |
| 7,007,589 B1 | | 3/2006 | Sanderson | |
| 7,069,802 B2 | | 7/2006 | Mikhail et al. | |
| 7,183,664 B2 | * | 2/2007 | McClintic | 290/55 |
| 7,485,979 B1 | * | 2/2009 | Staalesen | 290/44 |
| 7,569,943 B2 | * | 8/2009 | Kovach et al. | 290/44 |
| 7,759,811 B2 | * | 7/2010 | Boisvert et al. | 290/43 |
| 8,269,359 B2 | * | 9/2012 | Boisvert et al. | 290/43 |
| 2003/0138331 A1 | | 7/2003 | Fox et al. | |
| 2006/0205554 A1 | | 9/2006 | Nohara et al. | |
| 2007/0024058 A1 | | 2/2007 | McClintic | |
| 2007/0138798 A1 | * | 6/2007 | McClintic | 290/44 |
| 2007/0182273 A1 | | 8/2007 | Burt | |
| 2008/0296897 A1 | * | 12/2008 | Kovach et al. | 290/44 |
| 2009/0058095 A1 | * | 3/2009 | McClintic | 290/55 |
| 2009/0140522 A1 | | 6/2009 | Chapple et al. | |

FOREIGN PATENT DOCUMENTS

| | | | | |
|---|---|---|---|---|
| FR | 2755473 A1 | * | 5/1998 | |
| JP | 61212674 A | * | 9/1986 | |
| JP | 07229502 A | * | 8/1995 | |
| JP | 2005 248738 | | 9/2005 | |
| WO | 2007/053036 | | 5/2007 | |
| WO | WO 2010038562 A1 | * | 4/2010 | E02F 9/12 |

* cited by examiner

*Primary Examiner* — Joseph Waks

(74) *Attorney, Agent, or Firm* — Day Pitney LLP

(57) ABSTRACT

A hydraulic drive train with energy dissipation for electrical generation. A hydraulic pump is provided in the nacelle of the windmill and powered by the wind turbine shaft. This hydraulic pump provides high pressure oil to generators, typically at ground level. The generators are protected from high pressure oil spikes by a pressure relief valve. Electric pumps on the ground level provide or supercharge the oil to the hydraulic pump in the nacelle.

14 Claims, 6 Drawing Sheets

HYDRAULIC DRIVE TRAIN WITH ENERGY DISSIPATION FOR ELECTRICITY GENERATION

BACKGROUND OF THE INVENTION

This application claims priority under 35 U.S.C. §119(e) of U.S. provisional application Ser. No. 61/204,288 filed Jan. 5, 2009, the disclosure of which is hereby incorporated by reference.

FIELD OF THE DISCLOSURE

The present disclosure pertains to a hydraulic drive train and associated components for driving a turbine driven by wind, water or similar sources. The hydraulic drive train absorbs excess energy imparted to it, and dissipates it as heat. This further allows the use of multiple, smaller generators rather than as single large generator.

DESCRIPTION OF THE PRIOR ART

In the prior art of generating electricity from the wind or similar sources, one of the significant challenges is matching the variable and typically slow speed of the input shaft which is driven by the wind or water, to the high speed required by the electrical power generators. The typically approach in the past has been to use a gearbox to mechanically perform this function. Prior art which has used a gear box or similar mechanical devices may be found in U.S. Pat. No. 7,069,802 entitled "Distributed Power Train (DGD) with Multiple Power Paths" issued on Jul. 4, 2006 to Mikhail et al; U.S. Pat. No. 7,007,589 issued on Mar. 7, 2006 to Sanderson; U.S. Pat. No. 6,731,017 entitled "Distributed Power Train that Increases Electric Power Generator Density" issued on May 4, 2004 to Mikhail et al; U.S. Pat. No. 5,996,342 entitled "Hydrostatic Drive Train Controller" issued on Dec. 7, 1999 to Khan et al.; U.S. Pat. No. 4,585,950 entitled "Wind Turbine with Multiple Generators" issued on Apr. 29, 1986 to Lund; and U.S. Patent Application No. 2003/0138331 entitled "Metering Pump with Proportional Output" published on Jul. 24, 2003 by Fox et al.

Other prior art includes commonly-invented and commonly-assigned U.S. Patent Application No. 2007/0182273 entitled "Turbine with Constant Voltage and Frequency Output", published on Aug. 9, 2007.

Additionally, the handling of excess power must be addressed, such as when the speed of the wind or other source is greater than what the electrical generators can handle. The generators may be overdriven thereby shortening the life of the generators. The power from the overdriven generators, in turn, causes spikes in output power to the grid. Additionally, the extra power can cause the gearboxes to fail early. Moreover, as the machines have increased in size, the size and weight of the gearbox and the generator has also greatly increased.

OBJECTS AND SUMMARY OF THE DISCLOSURE

It is therefore an object of the present disclosure to provide a drive train for powering a turbine, wherein excess energy in the hydraulic system can be dissipated as heat.

It is therefore a further object of the present disclosure to provide a drive train for powering a turbine wherein the back end generators are typically mechanically decoupled from each other and the input shaft.

These and other objects are attained by providing an electrical generating system wherein the wind driven, or similar, components transmit energy to the turbine through a hydraulic drive train. The hydraulic fluid or oil is contained in a reservoir in sufficient quantity to provide a source for the components and to dissipate the heat generated. In an open loop arrangement, the hydraulic fluid or oil is returned to the reservoir after its completion through the circuit.

The current hydraulic system configuration has the main system at the ground level and the hydraulic pump located in the wind tower directly connected to the wind turbine shaft. This means the hydraulic fluid or oil needs to be pumped from ground level up to the hydraulic pump on the tower. This practice is commonly called supercharging the pump inlet.

Assuming the wind has sufficient speed and generates enough torque to turn the turbine shaft, the motor will turn and pump oil to a directional manifold block. The directional valves inside the block start and stop the fluid to the hydraulic motors which are directly coupled on a one-to-one basis with generators, providing the electric power. A proportional flow control valve is used to regulate the hydraulic motor speed and keeps the generator running at the proper revolutions per minute to generate the electrical power within the desired parameters. At this point the oil is then returned through a return filter and directed back to the reservoir.

The proportional flow control valves enable both the precise control of the generator and the release of excess energy as heat.

BRIEF DESCRIPTION OF THE DRAWINGS

Further objects and advantages of the disclosure will become apparent from the following description and from the accompanying drawings, wherein:

FIG. 1B top view schematic of the ground level of the electrical motorized assembly of the supercharging open loop system of the present disclosure.

FIG. 1C top view schematic of a portion of the directional manifold system of the present disclosure.

FIG. 1D top view schematic of a portion of the directional manifold system of the present disclosure.

DETAILED DESCRIPTION OF THE PREFERRED EMBODIMENTS

Figure 1A:
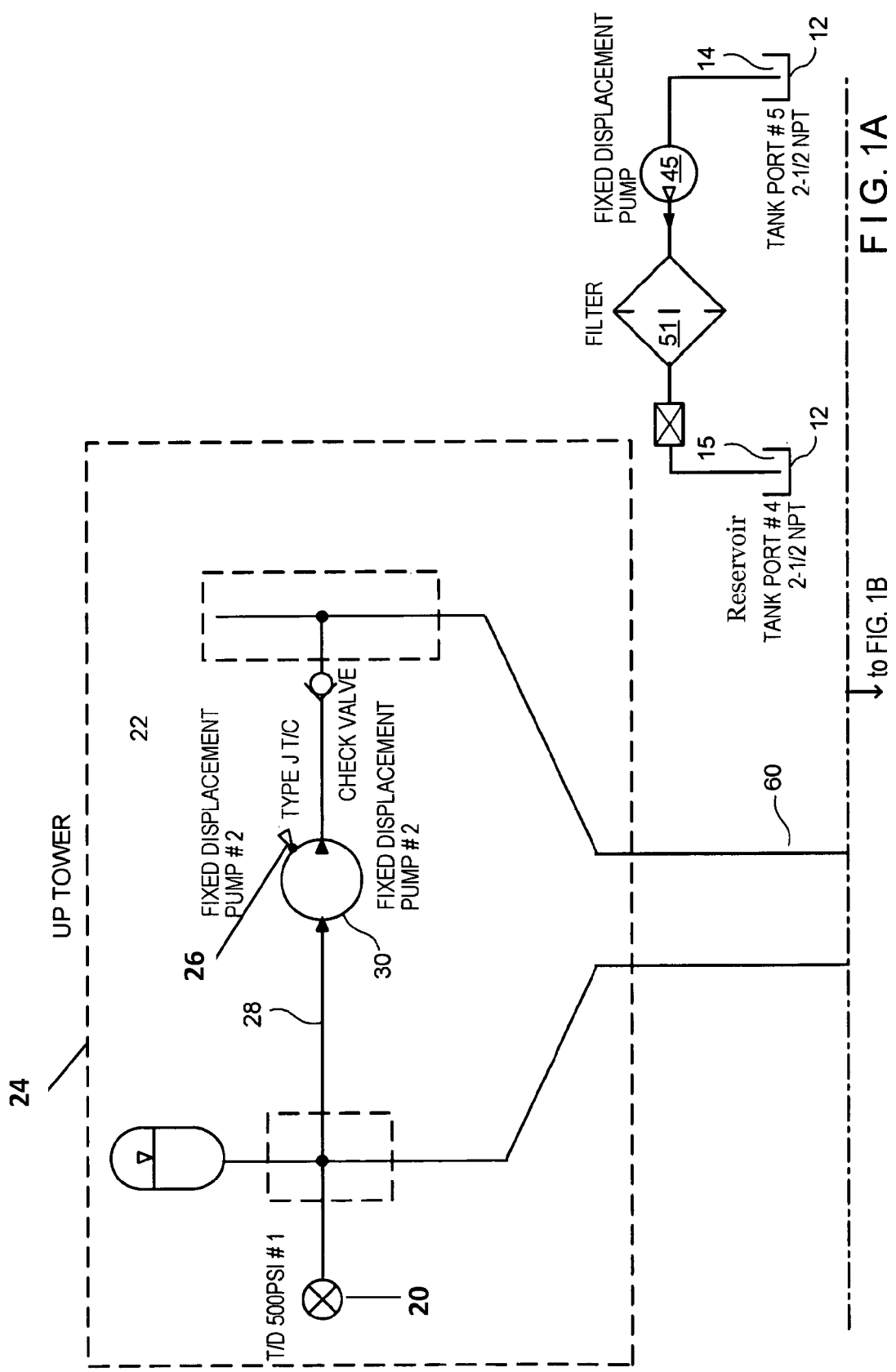
FIG. 1A is an above level and ground level view schematic of the apparati of the supercharging open loop system of the present disclosure.
Figure 1B:
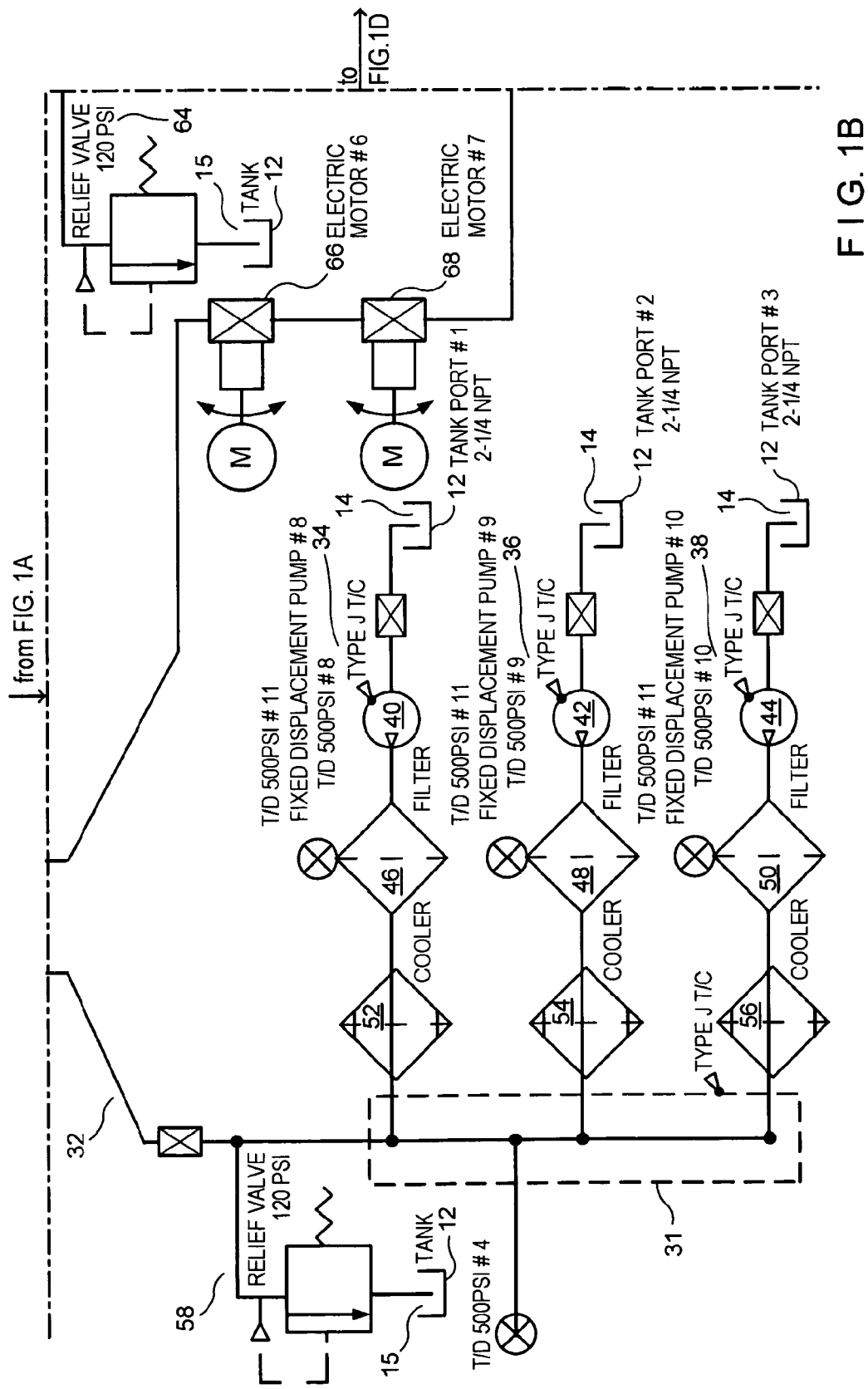
Figure 1C:
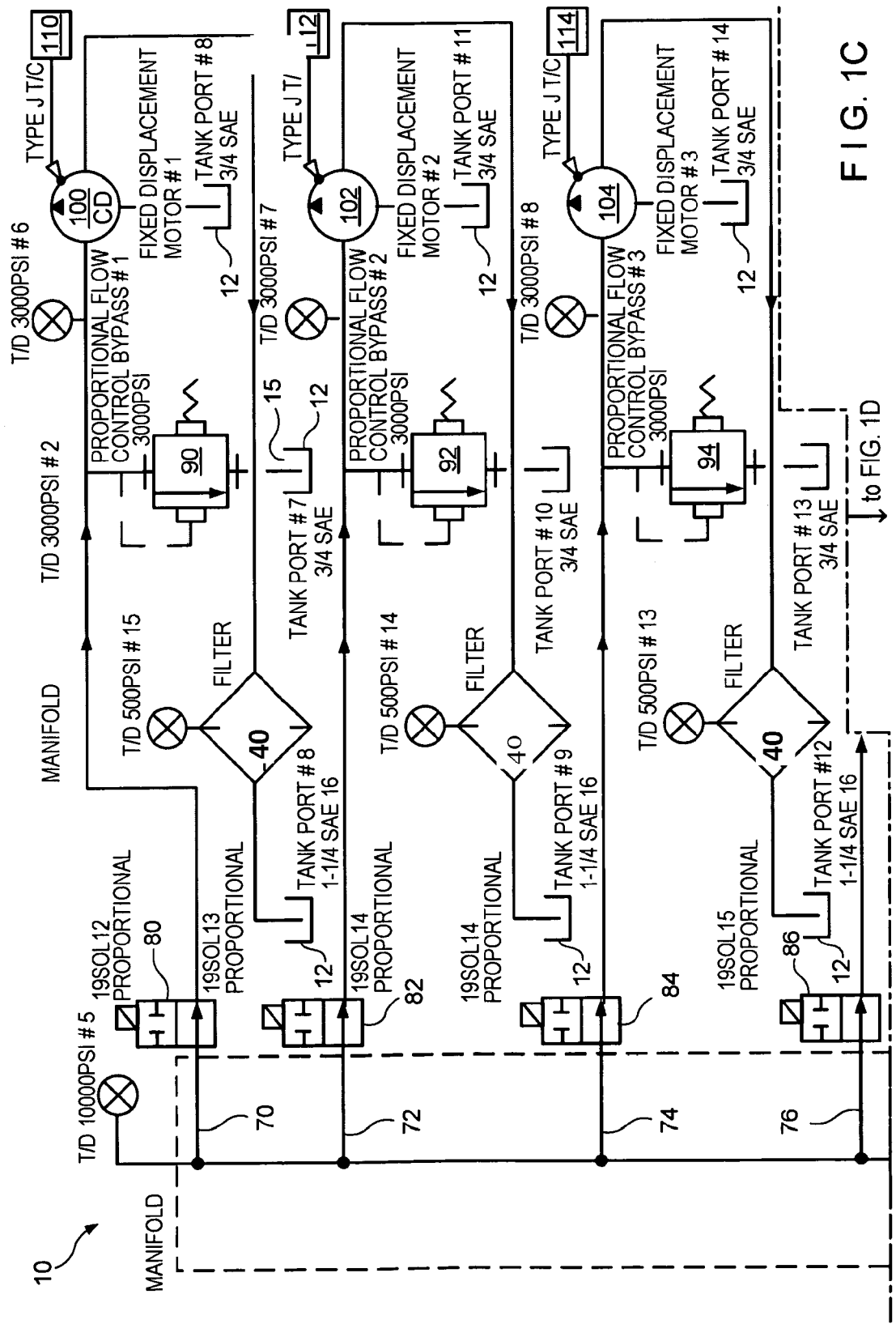
Figure 1D:
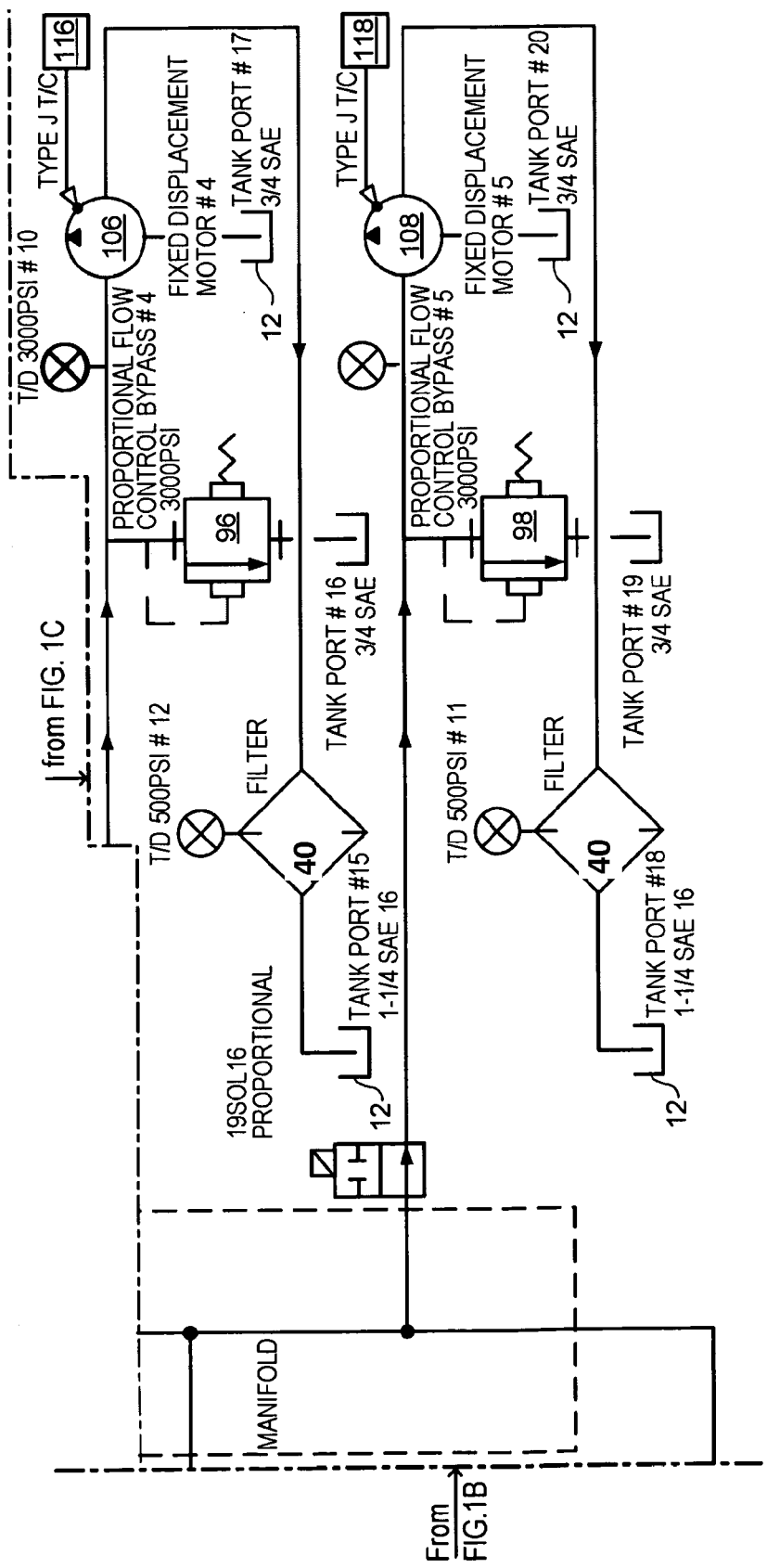

Referring now to the drawings in detail wherein like numerals indicate like elements throughout the several views, one sees from FIG. 1 that the system 10 includes a reservoir or tank 12 of oil or hydraulic fluid which includes various outlet ports 14 and inlet ports 15 throughout FIG. 1. The reservoir 12 is illustrated in FIG. 1 as associated with the various ports 14, 15 but is not illustrated as a unitary element. The system 10 is typically configured as an open loop system. The oil is contained in the reservoir 12 in sufficient quantity to provide a source for the various components and to dissipate the heat generated. In the open loop arrangement, the oil is returned to the reservoir after completion through the circuit. The reservoir 12 is typically sized for 2.5-3.0 times the maximum gallons per minute that the system 10 requires. A typical reservoir size is 500 gallons, but those skilled in the art will recognize, after review of the present disclosure, that different embodiments may require different reservoir capacities.

A wind turbine 20 and hydraulic pump 30 are located in a nacelle 22 at the top of a wind tower 24, while most of the remaining components are placed on the ground or otherwise away from the wind tower 24. By placing components on the ground rather than placing all components on the tower 24, less expensive and taller towers can be built. The wind turbine 20 includes propeller 26 and turbine shaft 28. Turbine shaft 28 drives hydraulic pump 30. This configuration requires that the hydraulic fluid or oil be pumped from ground level up to the level of hydraulic pump 30. This pumping of oil up to the level of the hydraulic pump 30 is typically called "supercharging".

This supercharging to hydraulic pump 30 via manifold 31 and pipe 32 is done by three independent electric motor/pump groups 34, 36, 38, typically located at ground level or otherwise away from tower 24. The electric motor pump groups 34, 36, 38 include motor-driven pumps 40, 42, 44; filters 46, 48, 50 and coolers 52, 54, 56. The electric motor/pump groups 34, 36, 38 include inlets through outlet ports 14 of the reservoir 12 thereby resulting in a flooded inlet configuration for motor driven pumps 40, 42, 44. The inlets are at the suction side of motor-driven pumps 40, 42, 44. The filters 46, 48, 50 and coolers 52, 54, 56 clean and cool the oil prior to supercharging the oil to hydraulic pump 30 via manifold block 31 and pipe 32. Manifold block 31 includes a low pressure, high response relief valve 58 which regulates the pressure on the low pressure side of the system and returns oil to reservoir 12 via inlet port 15 in over-pressure situations, which may occur as spikes. Concurrently, as shown in FIG. 1, oil from reservoir 12 is periodically being pumped from outlet port 14 by pump 45, filtered by filter 51, and returned to reservoir 12 via inlet port 15.

Electric motor pump groups 34, 36, 38 are typically at ground level and must be capable of supplying the required amount of oil to hydraulic pump 30 in the nacelle 22. Some embodiments of hydraulic pump 30 may pump approximately 708 cubic inches of oil per revolution in a positive displacement configuration. Therefore, the electric motor/pump groups 34, 36, 38 include a variable frequency drive to control the speed of the motor driven pumps 40, 42, 44. Some embodiments of motor-driven pumps 40, 42, 44 may pump approximately 5.31 cubic inches of oil per revolution in a positive displacement configuration. Typically, a pressure of 70 pounds per square inch is sufficient to provide oil to the hydraulic pump 30 in the nacelle 22. This configuration is particularly adaptable to cold starts of the system 10.

Figure 2A:
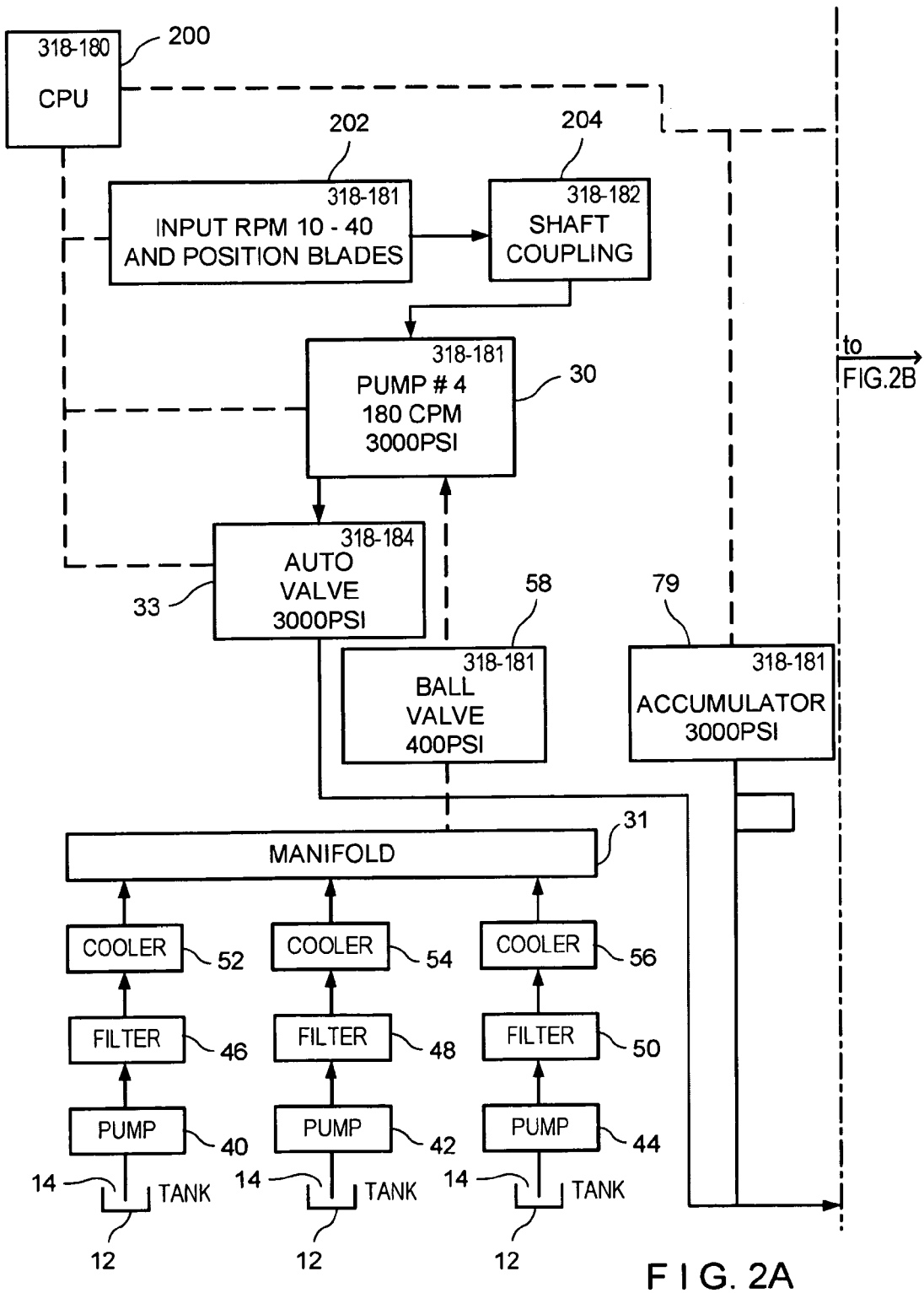
FIG. 2A is a schematic of the programmable logic controller structure of the apparatus of the present disclosure.
Figure 2B:
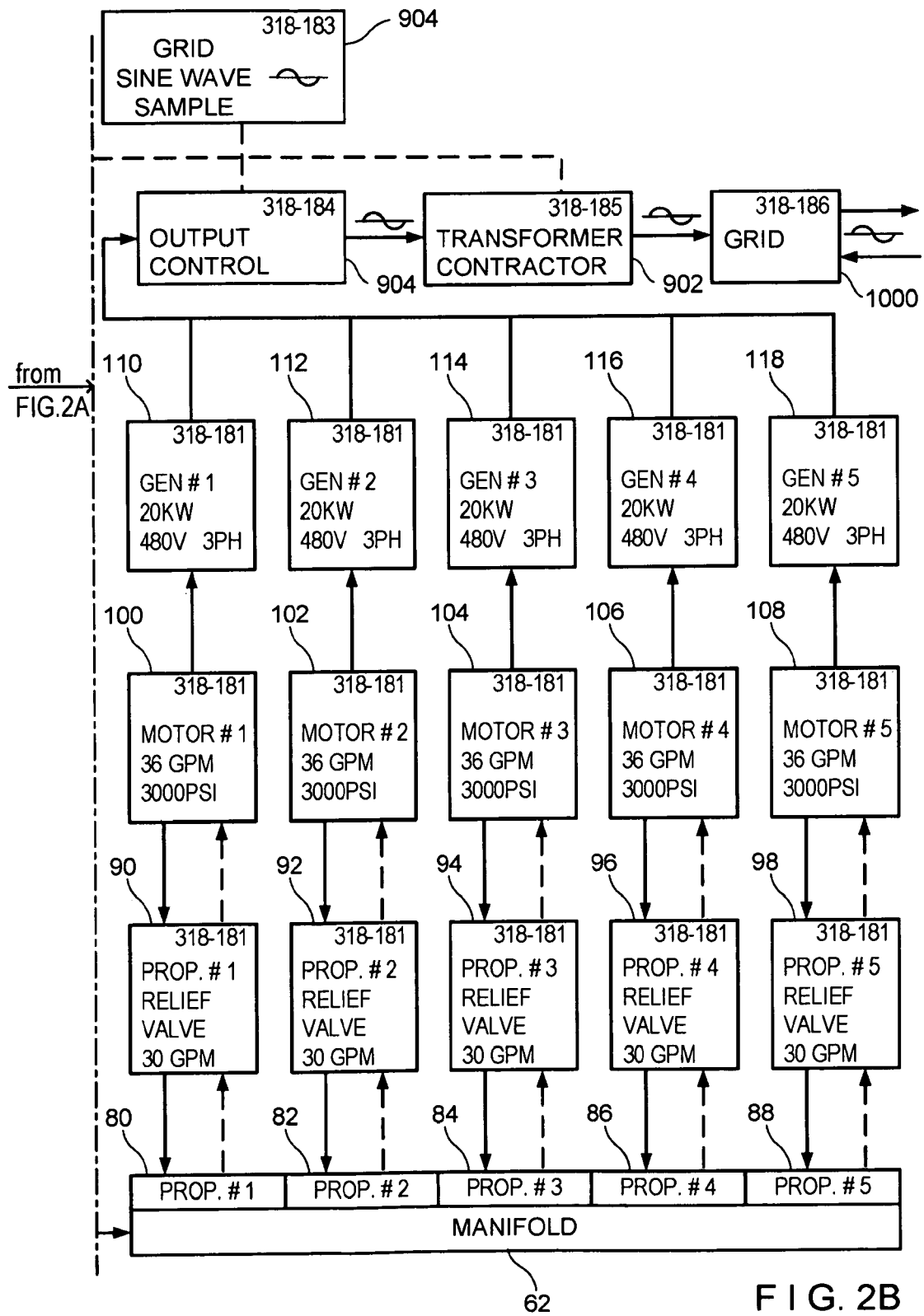
FIG. 2B is a top view schematic of the electrical control structure of the apparatus of the present disclosure.

An encoder on the turbine shaft 28 provides the signal information to the programmable logic controller (PLC) 200 via input RPM and position block 202 and shaft coupling block (see FIG. 2). PLC 200, in turn controls the variable frequency drive of motor-driven pumps 42, 44, 46. The positive displacement characteristics of hydraulic pump 30 and motor-driven pumps 42, 44, 46 allows for accurate control of the flow rates of the oil.

The hydraulic pump 30 provides high pressure oil via return pipe 60 to high pressure directional manifold block 62 (likewise typically at ground level or otherwise away from tower 24) which further includes high pressure relief valve 64 to protect the system from being over-pressurized and to return excess oil to the reservoir 12 via inlet port 15 thereby dissipating the excess heat. Return pipe 60 further includes electric motors 66, 68 to control the flow rate of oil through return pipe 60, thereby limiting the positive-displacement hydraulic pump 30, and therefore wind turbine 20, to a desired rotational speed which is determined by PLC 200 typically based on such factors as wind speed and factors relating to the various loads on system 10.

High pressure directional manifold block 62 provides oil to high pressure feeder lines 70, 72, 74, 76, 78 which further include respective proportional control flow valves 80, 82, 84, 86, 88, responsive to PLC 200 to regulate or cut off the flow, if necessary, to some high pressure feeder lines 70, 72, 74, 76, 78, such as at lower wind speeds. High pressure feeder lines 70, 72, 74, 76, 78 include respective proportional flow control valves 90, 92, 94, 96, 98 which, in the event of over-pressure, with a typical limit of 3000 psi, such as may occur during a gust in wind speed, relieve the over-pressure and divert oil to inlet ports 15. Some embodiments may divert this excess pressure to the drive system for motor-driven pumps 40, 42, 44. Similarly, an accumulator 79 (see FIG. 2) may be incorporated into feeder lines 70, 72, 74, 76, 78 or otherwise proximate to or upstream from high pressure directional manifold block 62 to absorb excess energy and store if for a later time when the input power wanes. The remaining high pressure oil is used to drive respective fixed displacement motors 100, 102, 104, 106, 108 with respective output shafts connected to electrical generators 110, 112, 114, 116, 118 which provide electrical power to electrical grid 1000 (see FIG. 2) via output control block 900 and transformer contractor 902. The grid sine wave sample block 904 receives samples from grid 1000 and send control signals to output control block 900 in order to conform the output of system 10 to the electrical conditions on grid 1000. Due to varying wind speed, the fixed displacement motors 100, 102, 104, 106, 108 need to be regulated for speed. This is done by through the proportional flow control valves 80, 82, 84, 86, 88 upstream for the inlets to fixed displacement motors 102, 104, 106, 108. Encoders on pump 30 provide a signal to the PLC 200 (FIG. 2) which, in turn, via auto valve control block 33, regulates the amount of oil through proportional control flow valves 80, 82, 84, 86, 88 (or similarly, through proportional flow control valves 90, 92, 94, 96, 98) to the motors 100, 102, 104, 106, 108 and regulates their speed (additionally, this regulation of the flow of oil through system regulates the speed of pump 30). The proportional flow control valves 90, 92, 94, 96, 98 typically pass at least 95 percent of the oil to the fixed displacement motors 100, 102, 104, 106, 108 for optimum efficiency.

After driving fixed displacement motors 110, 102, 104, 106, 108, the oil is thereafter filtered by respective filters 11, 112, 114, 116, 118 and returned to reservoir via inlet ports 15.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A system for generating electricity, including;
    a drive train for powering a wind turbine;
    a wind turbine for receiving input energy; and
    a hydraulic pump connected to the wind turbine located in
        a nacelle at the top of a wind tower above at least one
        positive displacement electric motor driver pump;
        wherein:
        the at least one positive displacement electric motor
            driver pump is adapted to supercharge and direct
            hydraulic fluid from at least one reservoir upwardly
            from the ground to the hydraulic pump in the wind
            tower such to convert the inputted energy via the
            supercharging into hydraulic fluid pressure by pressurizing the hydraulic fluid;

the at least one positive displacement electric motor driven pump includes an encoder which is controlled by a programmable logic controller;

at least one directional valve is configured to direct hydraulic fluid to the at least one positive displacement electric motor driven pump which in turn is directly coupled to at least one electrical generator;

at least one proportional control flow valve to regulate the amount of oil in the system and which is controlled by the programmable logic controller;

at least one proportional flow control valve configured to regulate hydraulic motor speed and adapted to control the revolutions per minute of the at least one electrical generator;

at least one high pressure relief valve configured to control the release of the input energy in the form of hydraulic fluid pressure such that the hydraulic fluid pressure is dissipated as heat; and the system is an open loop such that the hydraulic fluid is returned through a plurality of filters and directed back to the at least one reservoir through a plurality of inlet ports after completion through the system.

2. The system of claim 1, wherein the turbine receives energy from wind.

3. The system of claim 1, wherein the turbine and hydraulic pump are located in a position lower than a plurality of reservoirs where hydraulic fluid is contained.

4. The system of claim 1, wherein the turbine is adapted and configured to include an encoder device which transmits signals to the programmable logic controller.

5. The system of claim 1, wherein the at least one electrical motorized assembly is configured to control the flow rate of the hydraulic fluid.

6. The system of claim 5, wherein the at least one electrical motorized assembly has a speed controlled in response, at least in part, to wind speed.

7. The system of claim 1, further including a first manifold for receiving and distributing hydraulic fluid to at least one motor driven pump.

8. The system of claim 1, wherein the programmable logic controller is adapted and configured to control the proportional flow rate of the hydraulic fluid.

9. The system of claim 1, wherein the programmable logic controller is adapted and configured to control the rotational speed of the turbine.

10. The system of claim 1, wherein the programmable logic controller is adapted and configured to regulate a plurality of proportional valves.

11. The system of claim 1, further including at least one electrical generator configured to be driven by hydraulic pressure.

12. The system of claim 1, wherein the at least one proportional flow control valve is adapted to control the release of excess energy of the system such that the excess energy is dissipated as heat.

13. The system of claim 1, further comprising, a grid sine wave sample block adapted to receive samples from the grid and send control signals to an output control block.

14. The system of claim 1, wherein the at least one proportional flow control valve is controlled by the programmable logic controller.

* * * * *